(No Model.)
F. A. SCHORR.
EYEGLASS FRAME.
No. 256,861. Patented Apr. 25, 1882.
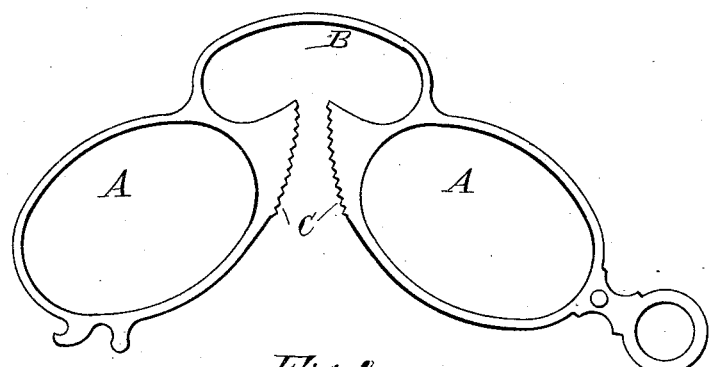
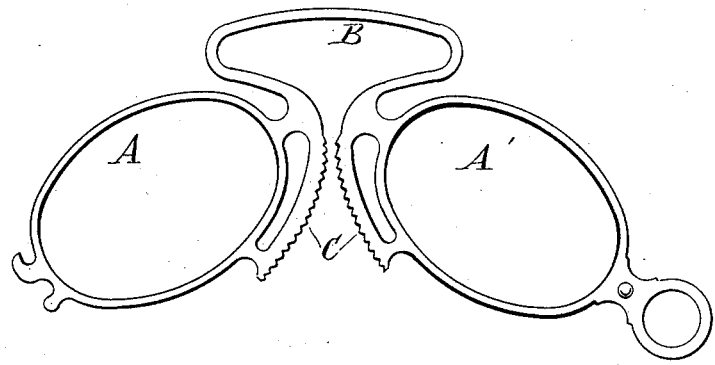
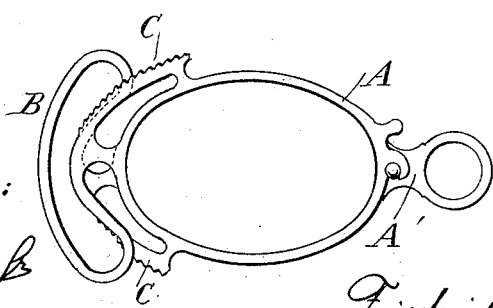
Witnesses:
Fredrich Clauss
Charles Nida
Inventor:
Friedrich Anton Schorr

UNITED STATES PATENT OFFICE.

FRIEDRICH A. SCHORR, OF ELIZABETH, NEW JERSEY.

EYEGLASS-FRAME.

SPECIFICATION forming part of Letters Patent No. 256,861, dated April 25, 1882.

Application filed October 8, 1881. (No model.)

*To all whom it may concern:*

Be it known that I, FRIEDRICH ANTON SCHORR, of Elizabeth, in the county of Union and State of New Jersey, have invented a new and Improved Eyeglass-Frame, of which the following is a full, clear, and exact description.

The object of my invention is to provide a new and improved eyeglass-frame in which the nose-spring or bow-spring is less liable to be broken than the bow-springs of the eyeglasses in use heretofore.

The invention consists in an eyeglass-frame made of a composition of matter—such as hard rubber—and having the two frames and the bow-spring made integral and of the same material.

In the accompanying drawings, Figure 1 is a longitudinal elevation of one of my improved eyeglass-frames, showing it opened. Fig. 2 is a longitudinal elevation of a modified construction of the same, showing it opened. Fig. 3 is a longitudinal elevation of the same, showing it closed.

Similar letters of reference indicate corresponding parts.

The two lens-frames A A of an eyeglass and the clamping-spring B uniting them are cut out of one piece of sheet-rubber or other composition of matter of a like or similar nature. The spring B is made integral with the frames A, and is not secured to the same by means of rivets or screws, as the springs of eyeglasses have been attached heretofore. In Figs. 2 and 3 a flat loop-spring is shown, and Fig. 1 shows an ordinary bow-spring.

The frames A can be provided with any desired kind of nose-rests, C, as the form and style of these nose-rests does not affect the spring B. The spring B, of rubber or a like composition, can be folded very easily, will not break nor lose its elasticity. The frames need not be weakened for attachment of this spring, as it is made integral therewith, whereas holes must be bored in the frames for attaching metal springs, whereby the frames are weakened and are also apt to be broken while attaching the springs. Finally, this spring is not attacked or affected by rust, and consequently will not be destroyed as rapidly as steel or brass springs are.

If desired, frameless glasses can be united by means of a rubber bow-spring, as such bow-spring will not rust. The rubber ordinarily used is a composition of gum and sulphur; but in place of this composition known as "rubber," I can use any other composition of a like or similar nature—for instance, celluloid or other pyroxyline compounds.

I am aware that in spectacle-frames the lens-frames and the nose-piece have been made integral; but that I do not claim.

Having thus fully described my invention, what I claim as new, and desire to secure by Letters Patent, is—

1. As an improved article of manufacture, an eyeglass-frame made, substantially as herein shown and described, of hard rubber or some analogous material, and having its lens-frames and bow-spring adapted to press the lens-frames against the sides of the nose, made integral and of the same material, as set forth.

2. In an eyeglass, the combination, with the lens-frames A, made of some composition of matter—such as hard rubber or pyroxyline—of the bow-spring B, adapted to press the lens-frames against the sides of the nose, made integral with the frames and of the same material, substantially as herein shown and described, and for the purpose set forth.

FRIEDRICH ANTON SCHORR.

Witnesses:
FREDERICK CLAN, Sr.,
CHARLES NIDA.